US011487978B2

(12) United States Patent
Juhala et al.

(10) Patent No.: US 11,487,978 B2
(45) Date of Patent: Nov. 1, 2022

(54) DATA-TRANSMISSION SYSTEM

(71) Applicant: Logmore Oy, Helsinki (FI)

(72) Inventors: Janne Juhala, Jyväskylä (FI); Antti Tapio, Keuruu (FI)

(73) Assignee: Logmore Oy, Helsinki (FI)

( * ) Notice: Subject to any disclaimer, the term of this patent is extended or adjusted under 35 U.S.C. 154(b) by 3 days.

(21) Appl. No.: 16/760,896

(22) PCT Filed: Nov. 5, 2018

(86) PCT No.: PCT/FI2018/050805
§ 371 (c)(1),
(2) Date: Apr. 30, 2020

(87) PCT Pub. No.: WO2019/086763
PCT Pub. Date: May 9, 2019

(65) Prior Publication Data
US 2021/0182641 A1  Jun. 17, 2021

(30) Foreign Application Priority Data
Nov. 3, 2017 (FI) ........................ 20175981

(51) Int. Cl.
*G06K 19/06* (2006.01)
*G06K 7/10* (2006.01)
(Continued)

(52) U.S. Cl.
CPC ...... *G06K 19/06112* (2013.01); *G06K 7/1095* (2013.01); *G06K 19/06131* (2013.01); *G01D 9/005* (2013.01); *H04Q 9/04* (2013.01)

(58) Field of Classification Search
CPC ........... G06K 19/06112; G06K 7/1095; G06K 19/06131; G01D 9/005; H04Q 9/04
(Continued)

(56) References Cited

U.S. PATENT DOCUMENTS 9,157,771 B1 * 10/2015 Scholes ................ G06Q 10/087
9,225,519 B1 * 12/2015 Fraccaroli ............ G06F 16/381
(Continued)

FOREIGN PATENT DOCUMENTS

| CN | 1946338 A | 4/2007 |
|----|-----------|--------|
| WO | 2013046231 A1 | 4/2013 |

OTHER PUBLICATIONS

International Search Report and Written Opinion in corresponding International Patent Application No. PCT/FI2018050805, dated Jan. 2015, 9 pages.
(Continued)

*Primary Examiner* — Michael G Lee
*Assistant Examiner* — David Tardif
(74) *Attorney, Agent, or Firm* — FisherBroyles, LLP; Robert Kinberg

(57) ABSTRACT

A data-transmission system, comprising measurement means, having memories, to create and collect measurement data, an output device having a zero-power passive state, to show in the zero-power passive state, machine-readable code containing the measurement data created using the measurement means, a power supply for the output device and the measurement means, a server arrangement to process and/or store the measurement data, and one or several reader devices to read the code from the output device in the zero-power passive state and arranged for data transfer with the server arrangement. The output device and measurement means with memories are to be arranged at monitoring objects.

26 Claims, 11 Drawing Sheets

(51) Int. Cl.
*G01D 9/00* (2006.01)
*H04Q 9/04* (2006.01)

(58) Field of Classification Search
USPC .......................................... 235/494
See application file for complete search history.

(56) References Cited

U.S. PATENT DOCUMENTS

| | | | |
|---|---|---|---|
| 2007/0213938 A1* | 9/2007 | Kai | G16H 40/67 |
| | | | 702/19 |
| 2010/0078482 A1 | 4/2010 | Bradford | |
| 2012/0305660 A1 | 12/2012 | Little et al. | |
| 2015/0041530 A1* | 2/2015 | Burkhart | G06K 19/06037 |
| | | | 235/494 |
| 2017/0193124 A1* | 7/2017 | Wong, Jr. | G06K 7/10297 |
| 2017/0270249 A1 | 9/2017 | Beerling et al. | |
| 2017/0322090 A1* | 11/2017 | Jones | G01K 1/022 |
| 2018/0018704 A1* | 1/2018 | Tunnell | G06Q 30/0269 |

OTHER PUBLICATIONS

International Preliminary Report on Patentability in corresponding International Patent Application No. PCT/FI2018050805, dated Sep. 27, 2019, 5 pages.

Chinese Office Action in corresponding Chinese Patent Application No. 201880071821.0, dated Oct. 11, 2021, 14 pages with English Google Translate.

\* cited by examiner

DATA-TRANSMISSION SYSTEM

CROSS-REFERENCE TO RELATED APPLICATIONS

This application is a U.S. National Stage of International Patent Application No: PCT/FI2018/050805 filed on Nov. 5, 2018, which claims benefit of Finland Patent Application No. FI 20175981 filed on Nov. 3, 2017.

TECHNICAL FIELD

The invention concerns a data-transmission system.

BACKGROUND OF THE INVENTION

A monitoring solution exploiting dynamic QR code, more generally code, is known from international patent application publication WO 2013/046231 A1. In it, when the state of the object being monitored changes, the QR code is also updated to correspond to the state. In other words, the state data of the object can be included in the QR code contained the server's URL address. The QR code can be read, for example, using the camera of a mobile device and a QR code application in an as such known manner. On the basis of the reading, a service request is sent to the server individuated by the QR code and, using the same service request object's state data, measurement data contained in the QR code is also transmitted to it.

Another solution of the aforementioned type is also known from US patent application publication US 2017/0270249 A1. Known from this is the use of dynamic QR code to transfer data to an embedded URL address, which is exploited in medical devices.

Some drawbacks in the aforementioned solutions are, however, their high power consumption and then poor applicability to objects lacking a continuous external power supply. In addition, the applicability of the above solutions, for example, to logistical applications is challenging. In a logistics delivery chain, an enormous group of monitoring objects are typically monitored continuously, and also at the various stages of the delivery chain. This creates a challenge for the usability of the system. The operations relating to the monitoring of the objects should be as easy as possible, for example, in the case of starting the system, reading data and sending them to a server, so that monitoring the objects will not essentially affect costs. On a more general level one can also speak of the user-friendliness of the monitoring. In addition, in the case of implementing the reader device, the system should be as simple as possible, so that any consumer device equipped with a machine-readable code-reading function can be used, without the system demanding special tailoring or properties of the reader device relating to the implementation of the system.

In addition to the above, controlling the operation of the measurement means also relates to the same user-friendliness problem, such as their programming, for example, during start up. The measurement means therefore cannot be equipped with demanding data-inputting means, because their price would then rise and thus their usability particularly in large-volume applications would weaken. Besides reading and transmitting data, the start up and programming of the measurement means should also be as simple as possible, so that the usability of the system in large-volume applications does not suffer, i.e. the operations relating to the system do not take an inordinate amount of time or effort.

The encryption and authentication of known solutions also leave much to be desired in the reliability of the implementations. The amount of data to be transmitted with QR code is also limited and often insufficient.

SUMMARY OF THE INVENTION

The present invention is intended to create an improved data-transmission system. According to one embodiment of the invention, there is provided a data-transmission system comprising measurement means comprising memories to create and collect measurement data, an output device having a zero-power passive state, to show in the said zero-power passive state machine-readable code containing the measurement data created using the said measurement means, a power supply for the output device and the measurement means, server arrangement to process and/or store the measurement data, and one or several reader devices to read the code from the output device in the said zero-power passive state, and arranged for data transfer with the server arrangement. The output device and measurement means with memories are to be arranged at monitoring objects.

The invention permits a user-friendly data-transmission system, for example for large-volume monitoring objects, which lack an external continuous power supply, such as mains electricity. In the invention, the output device showing machine-readable code containing measurement data created by the measurement means and to be arranged at the monitored object has a passive state, in which it is arranged to be zero power. In addition, the output device is to be arranged to show in a zero-power passive-state code readable by a reader device. The output device can then be said to be low-power. The output device to be arranged at the monitored object and also the power supply of the measurement means can be self-powered. In addition to the output device the measurement means too can be low-power, as can the memories. Owing to the invention, a very energy-efficient system can be implemented, which will preferably last through the entire life of the monitored object.

A significant advantages relating to the usability of the system is also achieved with a property of the output device, according to which it is to be arranged to show code readable on the reader device at a zero-power in a passive state. In addition to saving power, the measurement means can be implemented as self-powered, the code can be read if wished, nor does its presentation necessarily demand special actions by the user. This is a significant usability advantage in large-volume applications, in which there can be many monitoring objects to be read, and actions relating to bringing the code up slow down operation. Owing to the property, code can be read, for example, continuously.

According to one embodiment, in the invention two-way data transmission can also be used between the measurement apparatus formed of the measurement means and the output device, and the server arrangement, preferably transmitted by the reader device. Thus, in addition to the measurement data being transmitted from the measurement means to the server arrangement, the measurement apparatus can also be controlled using the server arrangement, or even more particularly through the server arrangement. The reader device can perform several different tasks in this control. The reader device can be used to set the settings of the measurement apparatus. This can include, for example, using the reader device to enter settings in the measurement apparatus. The settings can, in turn, come from the server arrangement or initially from the reader device itself. Thus making measurement-apparatus settings using the reader device can, in addition to entering settings, include also making settings, which thus takes place by the reader device to the server arrangement, before the programming of the measurement apparatus respectively. On the basis of making of settings by the reader device, or of settings made to the server arrangement in some other way, the server arrangement can form, for example, web content, in which the settings are coded and which is then received from the server arrangement using the reader device. The reader device then for its part enters the settings, coded in this web content, in the measurement apparatus. This then also improves the system's usability, because settings relating to the measurement apparatus can easily be made, even using as such known consumer devices, without demanding of them additional properties, functions, or software.

In addition, according to one embodiment, owing to two-way data transmission the reader device can read measurement data from the measurement object, which does not fit with one visual code. The reader device can preferably request the next code immediately it has read the previous code and sent it to the server arrangement. This also permits large amounts of data to be easily read. In addition, two-way data transmission can also permit the excitation of the measurement apparatus and/or the output device belonging to it and also the synchronization of the measurement apparatus's clock by the server arrangement.

According to one embodiment, the invention also allows low power to be used to implement encryption. One possible way to implement low-power encryption is one-use key encryption based on a random number and the XOR encryption method. This offers a simple way to implement energy-efficient encryption that also demands a relatively small amount of memory, without encryption algorithms that need greater processor power.

Owing to the invention, it is possible to implement an improved, user-friendly, energy-efficient, and data-secure data-transmission system for collecting, creating, transmitting, and processing object data. A low-power output device, a processor and memory belonging to the measurement means, the capacity of which is also arranged to suffice for the service life of the measurement apparatus and/or monitoring object, combined with easy usability and efficient but simple possible encryption permits the said advantages of the data-transmission system according to the invention and the improvements relative to known systems. Other characteristic features and advantages of the invention may be appreciated from the following detailed description considered in conjunction with the accompanying drawings.

BRIEF DESCRIPTION OF THE DRAWINGS

In the following, the invention, which is not restricted to the embodiments presented in the following, is described in greater detail with reference to the accompanying figures, in which.

DETAILED DESCRIPTION OF THE INVENTION

Figure 1:
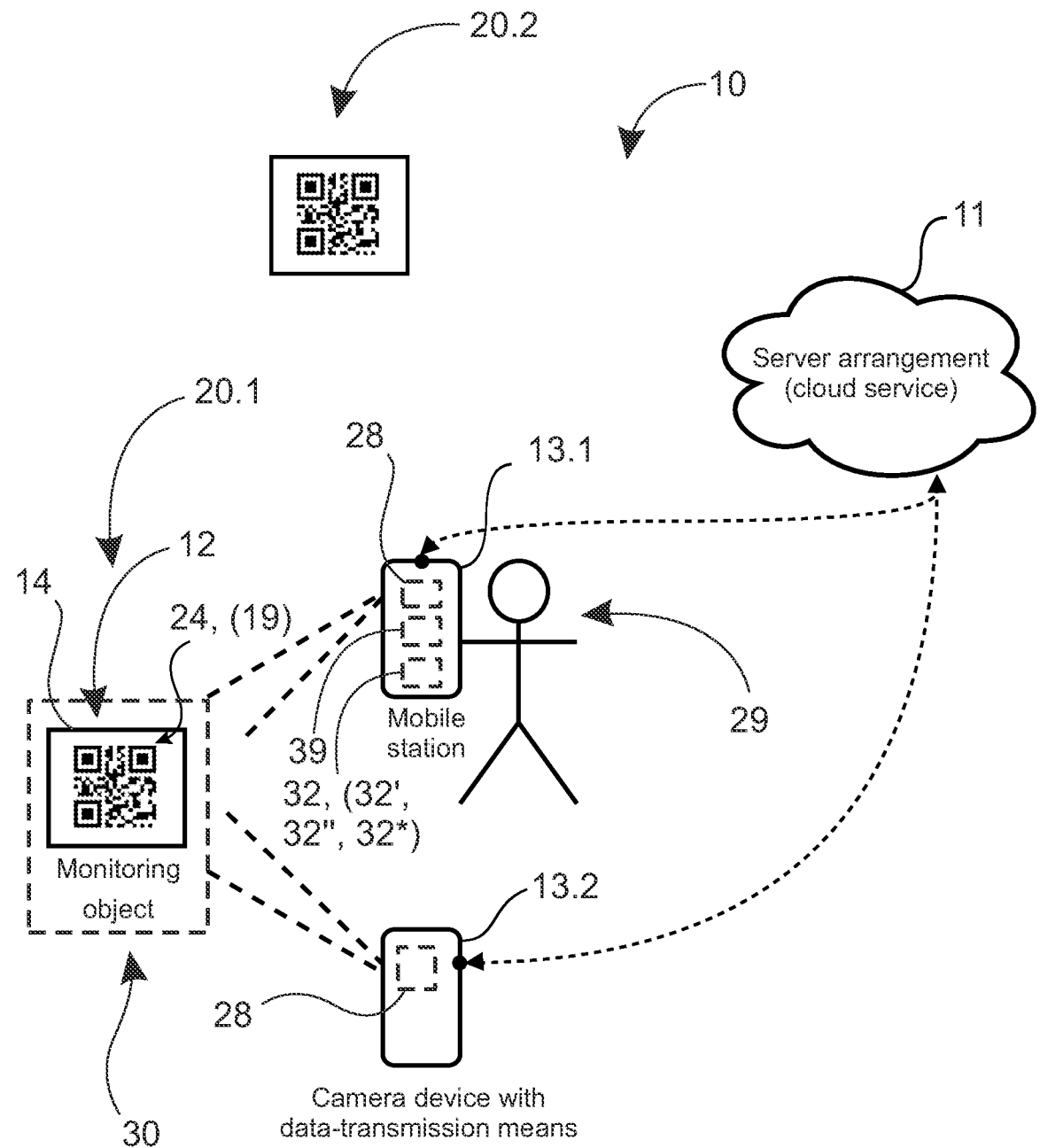
FIG. 1 shows a simplified schematic diagram of one example of the data-transmission system.
Figure 2:
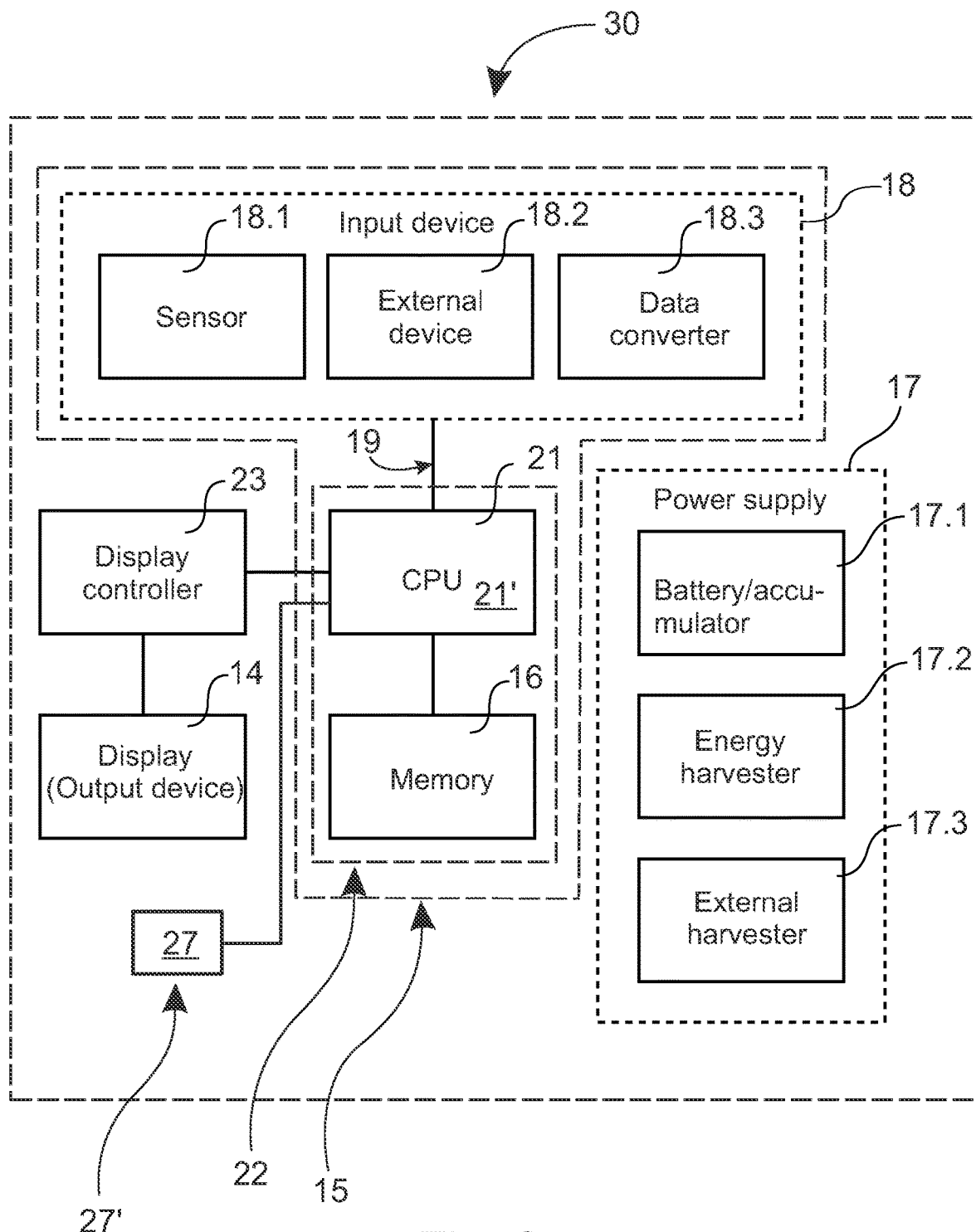
FIG. 2 shows a simplified schematic diagram of one example of the measurement apparatus located at a monitoring object, schematically as a block diagram.

FIG. 1 shows a simplified schematic diagram of one example of the data-transmission system 10. The basic components of the system 10 include a server arrangement 11, one or more reader devices 13.1, 13.2, and measurement apparatus 30 arranged at monitoring objects 20.1, 20.2. This measurement apparatus 30 includes, as parts, an output device 14, measurement means 15 equipped with a memory 16, and a power supply 17 (FIG. 2). The output device 14 and the measurement means 15 with memories 16, more generally the measurement apparatus 30, is to be arranged at the monitoring objects 20.1, 20.2, one or more of which can be arranged in the system 10. The monitoring object can be stationary or moving. One example of a stationary monitoring object is a building, in which, for example, moisture is measured and stored. One example of a moving monitoring object is frozen-goods transport and the transportation units in it. In it, the temperature through the cold chain of, for example, transport or even individual product packages in it, can be measured and stored.

FIG. 1 shows only the output device 14 of the measurement apparatus 30 in greater detail. The output device 14 is intended to show the machine-readable code 12 contained in the measurement data 19 created by the measurement means 15 and thus to offer the measurement data 19 to be read by the reader device 13.1, 13.2. Instead of code, a machine-readable graphical identifier can also be referred to. Data relating to the monitoring object 20.1, 20.2 is arranged in the code 12 in coded form. In addition, the code 12 can also contain information as to where the code's 12 coded data 19 is to be sent after reading.

The output device 14 is a readable device, a display, which can be used, for example, to show readable code 12, which is thus preferably visible optical code 24. One example of code 12 can be QR (Quick Response) code 24. The code 12 can be characterized in being decoded and read quickly. In addition, the code 12 can be advantageously processed using known consumer models of reader devices, without its reading needing a special device arranged for reading the code 12 in question. The code 12 can be mainly continuously visible on the output device 14. On the other hand, it can also be made visible on the output device 14 on the basis of a set criterion. One example of these can be an excitation according to a set criterion directed to the measurement apparatus 30, the position data of the measurement apparatus 30 according to a set criterion and/or even something else, for example, a time-based criterion, which can be set, for example, by the user/maintainer of the system 10.

The excitation for showing the code 12 can be, for example, pressing a button in the output device 14, or a signal detected by the output device 14 and identified as excitation, such as a light or sound signal. The excitation can be given, for example, by the reader device 13.1, 13.2. The excitation can be generated, for example, by the server arrangement 11. The excitation can be transmitted to the output device 14, for example, through the reader device 13.1, 13.2. One can refer more generally to remote control of the output device 14 and/or the measurement means 15, more generally of the measurement apparatus 30 by the server arrangement 11 through the reader device 13.1, 13.2.

The output device 14, 14' can be of a type that has different states of power consumption. One of these states on the output device 14, 14' can be passive in power consumption (e.g. "sleep mode"). In a passive state, the output device 14, 14' is arranged to be zero-current, i.e. it then consumes essentially no power. In addition, the output device 14, 14' is arranged, or more generally is to be arranged to display in a zero-power passive state the code 12 readable using the reader device 13.1, 13.2. The output device 14, 14' can be said to use current only when the code 12 is updated. The output device 14, 14' can then also be said to be low-current. In addition it can be implemented to be self-powered. The updating of the output device 14, 14' can also be stopped. This can be done for a specific time, if it is known that the code 12 is not read. This can be, for example, a period of time set manually. This can also be an adaptive power-saving state based on a photo-sensor 27 belonging to the measurement apparatus 30. Then, when it is, for example, totally dark, the output device 14, 14' is not updated. Further in addition, the criterion can also be based on temperature and/or vibration.

When the code 12 is shown on the output device 14, 14' can, for example, be set in the aforementioned suitable manner. An output device 14, 14' showing code 12 when in a passive state is preferable also in terms of the system's 10 usability. The code 12 can then always be read when desired without separate operations to bring it up. This property essentially accelerates the reading of the monitoring objects 20.1, 20.2.

Examples of the output device 14 can be display means based on e-paper display technology, which are generally known as, for example, e-Ink or e-Paper displays. One commercial example is the Good Display GDEW0154T8. The output device can also be some one-use output means 14' (FIG. 8a-8c) or also, for example, a pulse display. Thus the output device 14, 14' can be dynamic or also static.

The system 10 includes one or more reader devices 13.1, 13.2 for reading the code 12 containing measurement data 19 from the output device 14 and arranged for data transfer with the server arrangement 11. In addition, at least some of the reader devices 13.1, 13.2 can also be arranged for two-way data transmission with the server arrangement 11. The reader device can be, for example, a reader device 13.1 operated by a person 13.1, such as a mobile station with a camera, a "smart phone", tablet device, or also, for example, AR or VR (Augmented Reality/Virtual Reality) glasses. In the reader device 13.1 are functions 28 for reading optical and graphical code 12 (for example, a camera, which is used as a QR code 24 reader device and a function for processing QR code for transmission/a service request) and/or it can produce excitation for the output device 14. The function 28 can be used to decode visual QR code 24 into data and send it, in addition, preferably to an internet address contained in the QR code 24.

The reader device 13.2 can also be automatic. It can be implemented using a camera linked to a data-transmission network and thus equipped with data-transmission means, which reads like a mobile station optical code 24 acting as code 12 and/or can produce excitation for the output device 14. The reader device 13.2, such as, for example, precisely a mobile station, can be monitoring, for example, monitoring objects travelling on a conveyor belt, which it reads automatically as they pass the reader device 13.2.

The server arrangement 11 belonging to the system 10 is, for example, for processing and/or storing measurement data 19, obtained through reading code 12 from the measurement means 15, i.e. the measurement apparatus 30. The server arrangement 11 can form a cloud system or service, which includes at least one server computer. As a result of reading the code 12, the reader device 13.1, 13.2 transmits measurement data 19 from the measurement apparatus 30 to the server arrangement 11. The server arrangement 11 then stores and processes the measurement data 19, and if necessary also forwards it, for example, back to the reader device 13.1, 13.2. The reader device 13.1, 13.2 and server arrangement 11 can be linked to each other, for example, over a wireless data-transmission network, such as a mobile network.

Figure 8A:
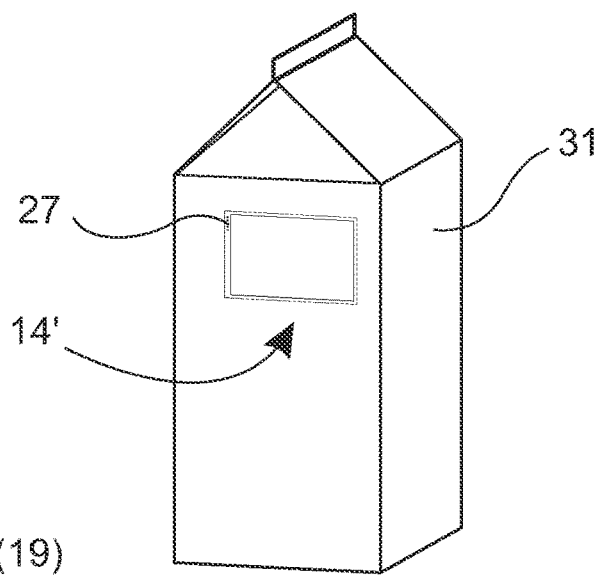
FIGS. 8a-8c show examples of one other embodiment relating to the implementation of the reader device.
Figure 8B:
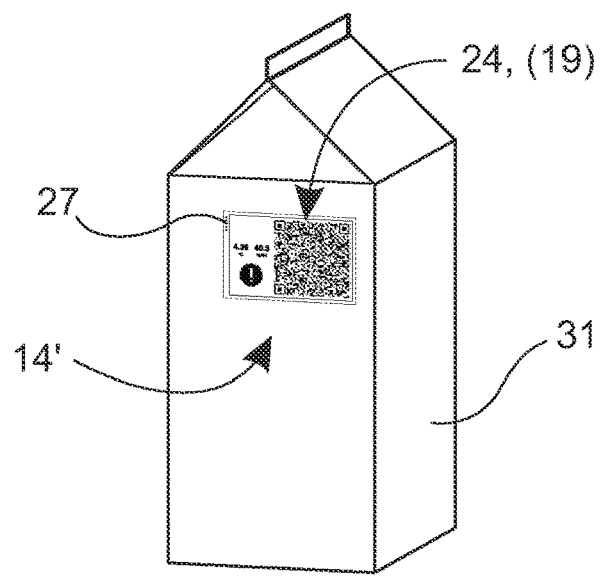
Figure 8C:
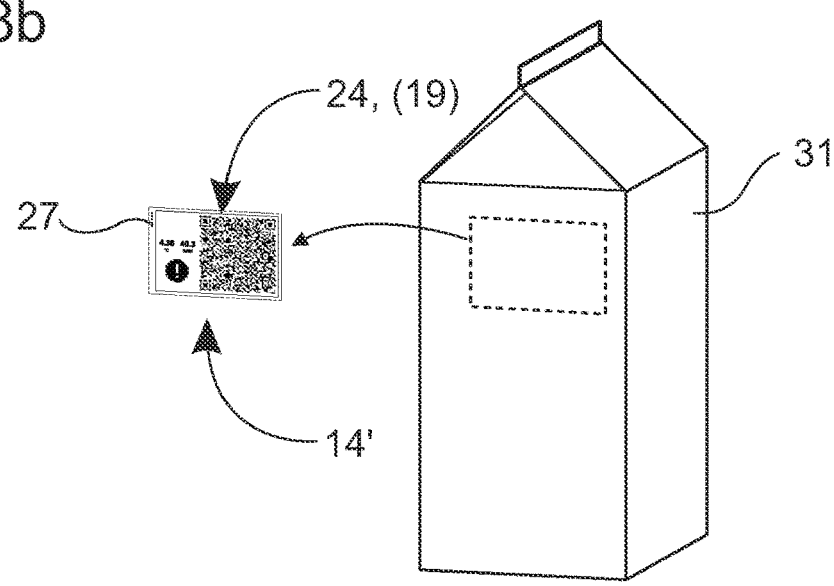

FIG. 2 shows a simplified schematic diagram of one example of the operations belonging to a monitoring object 20.1. The operations can be understood in this by the general name measurement apparatus 30. The measurement apparatus 30 includes an output device 14 i.e. a display. Code 12 acting as data-transmission code, i.e. now optical QR code 24, is formed for it, which is then shown visually by the output device 14. The display can be formed at least partly from, for example, an LCD display, as described hereinafter or, as stated above a display, which does not need electricity to keep drawn figures on the display. An example of such a display technology are displays based on e-paper display technologies (EPD), such as an e-Ink or e-Paper display. A one-use display, on which a figure is drawn only once, can also act as the display technology. Drawing can, of course, take place in one or more batches, for example, on different areas of the display. FIGS. 8a-8c show this embodiment in some-what greater detail.

The measurement apparatus 30 includes not only the output device 14 but also measurement means 15 equipped with memories 16 to form and collect measurement data 19. Measurement data 19 is stored in the memory 16 in a set manner. Code 12, i.e. now QR code 24 is formed from the measurement data 19 stored in the memory 16 for display by the output device 14. The measurement means 15 can include one or more forming means 18 for creating the measurement data 19 and processor means 21 to process the measurement data 19 created by the forming means 18 for the output device 14 (creating QR code 24) and also to possibly encrypt the measurement data 19 (before creation of the QR code 24). Parts 18 and 21 with memories 16 can also be referred to as a data-collection device or data-logger. Thus the forming devices 18 can create measurement data 19 in a set manner continuously to monitor the monitoring object 20.1, 20.2 over a longer period of time, for example, in a logistics chain and collect measurement data 19 in the memory 16.

The forming means 18 can be any device whatever, which produces data, such as, for example, one or more sensors 18.1, which produce measurement data, such as, for example, temperature, pressure, or moisture values. The forming means 18 can also be an external data source 18.2, such as, for example, a connection to another device, for example a separate measurement device. The forming means 18 can also be, for example, a data converter 18.3. It can, for instance, listen to an external data source and convert the data to be compatible with the processor means 21. The creating means can also understand a mathematical algorithm. With it, more refined measurement data can be created from the raw data produced by the sensor data already in connection with the measurement means 15.

The processor means 21 include at least one processor 21' for processing, for example, the measurement data 19 created by the forming means 21 for the output device 14 and also possibly encrypting the measurement data 19. It reads the data 19 from the forming means 18, stores it, possibly encrypts it, and forms the code 12 used for optical data transmission, identifier code, on the basis of the preferably encrypted measurement data 19 intended to be transmitted. The processor 21 can be, for example, on a processor card 22 and can contain the memory 16 needed for processing. The memory 16 needed to store the measurement data 19 and the code 12 formed from it can be a separate memory or built in to the processor circuit. In addition to the output device 14 also the measurement means 15 with memories 16 can be low-power. One example of a processor circuit for a low-power measurement means' 15 processor 21 is Texas Instruments MSP430 series.

According to one embodiment, the low-power memory 16 belonging to the measurement means 15 can be, for example, non-volatile memory. One example of this is, for example, FRAM type (Ferroelectric Random Access Memory) memory. In this case, non-volatile refers to the fact that the memory need not be continuously refreshed to retain data in the memory 16, which makes it precisely low-power. Other known FRAM type memories are generally known by the abbreviations F-RAM or FeRAM, depending on their providers. The memory can also be a low-power memory of a type only being developed and following a known FRAM type memory in operating principle. These are characterized by the contents of the memory being able to be changed using a relatively low power compared, for example, to a FLASH memory, which makes the memory low power on its part. A resistive RAM type memory (RRAM or ReRAM) can be another example of a suitable low-power memory, instead of a FRAM type memory. Instead of a non-volatile memory, other types that take very little power can be used, for example, for memory storage and/or memory maintenance, but which are however arranged to last a reasonable operating period, such as 0.5-3 years.

The processor means 21 can also be equipped with a power-saving property. According to one embodiment, it can have low-power modes (LPM), which can switch off the processor with the aid of interruptions when it is not needed. It then consumes very little power, if any at all. With a FRAM type memory, the operating voltage is arranged to be, for example, 0.5-4 volts, particularly 1-2 volts, but however clearly less than 10 volts, which is a typical example of a FLASH-memory's voltage requirement.

The measurement apparatus 30 can also include a display controller 23, which controls the display on the basis of data obtained from the processor 21'. The display controller 23 can also be built into the processor circuit or to the display panel.

The measurement apparatus 30 also includes a power supply 17 for the output device 14 and measurement means 15. The devices and means belonging to the measurement apparatus 30 get their operating power from the power supply 17 as needed. The power supply 17 can be, for example, a battery 17.1, an energy harvester 17.2, which can generate energy, for example, from electromagnetic waves, vibration, light, or heat. Preferably, however, the power supply 17 for the output device 14 and measurement means 15 is a local self-powered power supply. The monitoring object 20.1, 20.2 can then be without a fixed mains power supply for most of its operating time. The power supply 17 can, for example, be dimensioned to last for the duration of the measurement or the life of the measurement apparatus 30, such as, for example 0.5-3 years. One possible criterion for the duration of measurement or the life of the measurement apparatus 30 can also be the duration of filling the memory 16.

Figure 9:
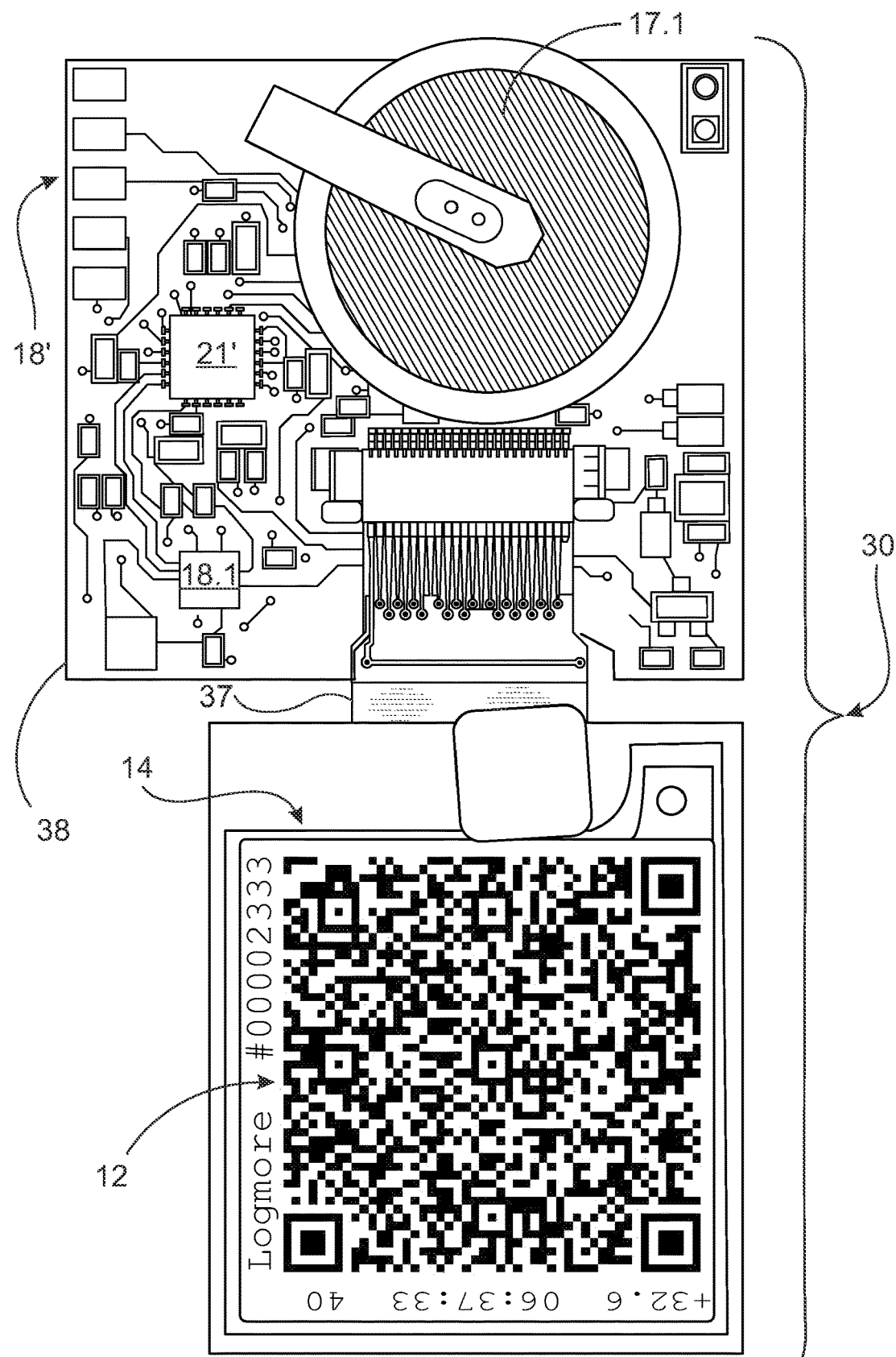
FIG. 9 shows an example of the electronics belonging to the measurement apparatus.
Figure 10A:
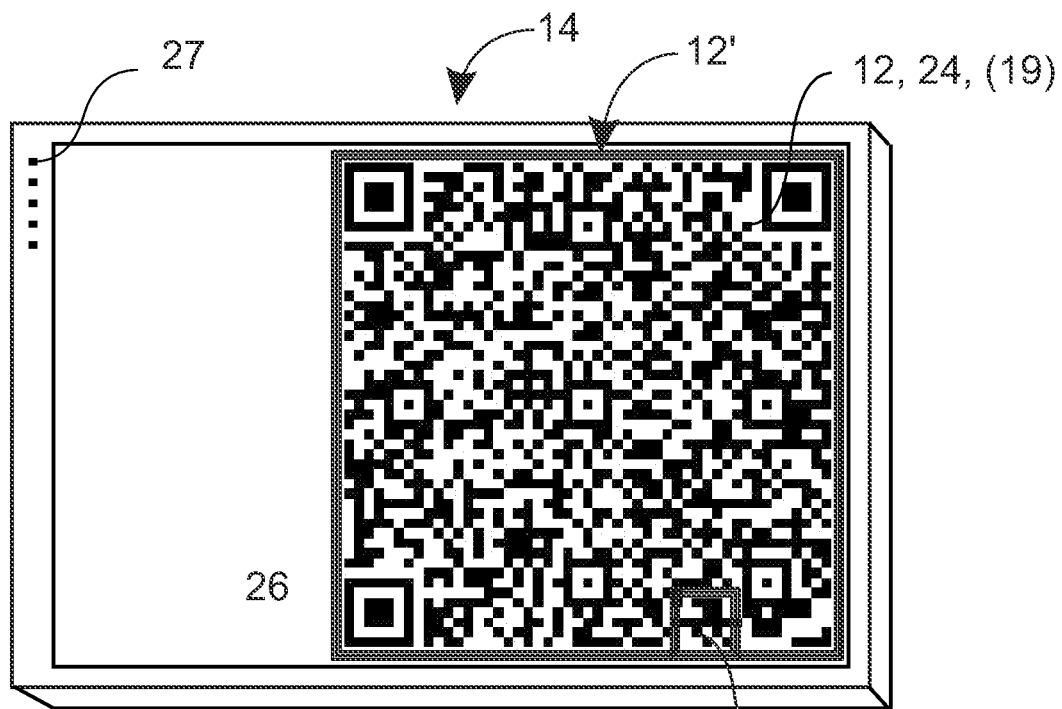
FIGS. 10a and 10b show some examples relating to machine-readable code as low-power implementations.
Figure 10B:
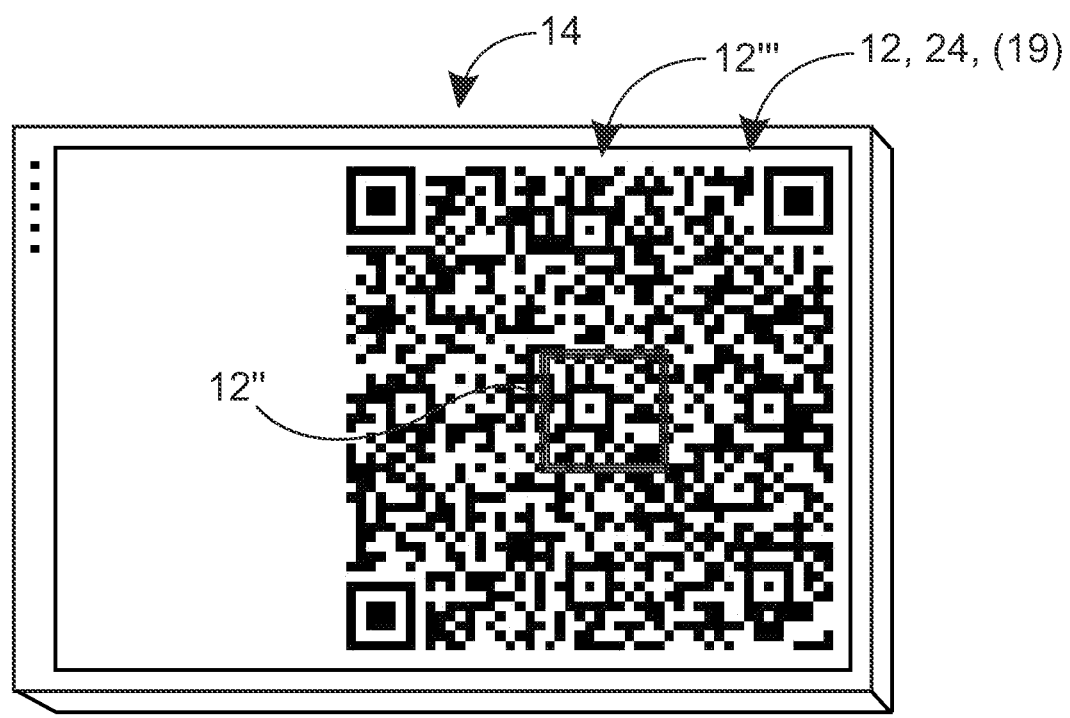

FIG. 9 shows one example of the electronics belonging to the measurement apparatus 30. Its main parts are numbered with the reference numbers referred to above. FIG. 9 shows the battery 17.1, CPU 21', temperature sensor 18.1, and programming pins and pins 18' for external connections, arranged on the circuit card 38. The output device 14 has a ribbon connection 37 to the card. In the measurement apparatus 30, the output device 14 is folded from the ribbon connection 37 to the rear of the circuit card 38.

Figure 3:
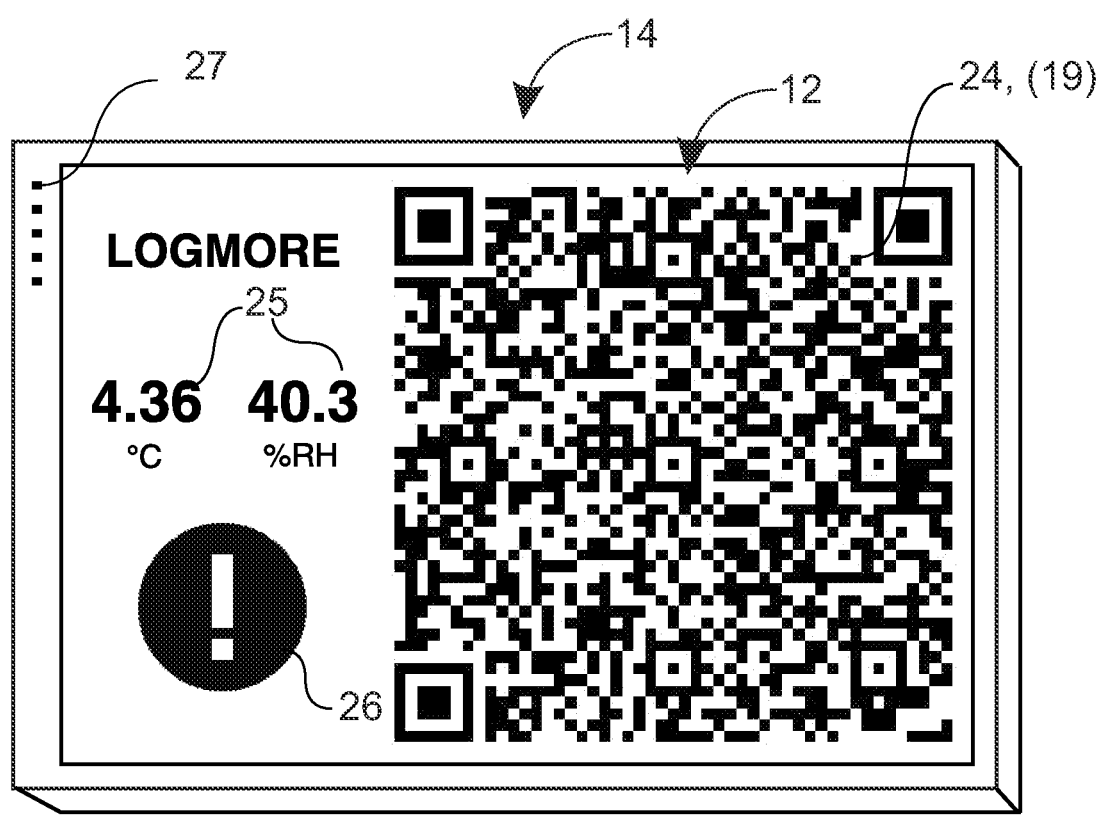
FIG. 3 shows a schematic example of the display device and the code it shows.

FIG. 3 shows schematically an example of the output device 14 and the code 12 shown on it. On the output device 14 the code 12 is shown by a dynamic visual graphical element, such as, for example, QR code 24. The QR code 24, or more generally the code 12, can be continuously visible, or it can be displayed only when needed or requested. In addition, the output device 14 can be used to show, for example, a momentary measurement value 25, which can be updated from time to time. The data 25 and measurement data 19 can be, for example, temperature, moisture, acceleration, carbon dioxide, some electrical variable, or any other measurable variable at all, or also a measurable variable's minimum, maximum, mean value, or other value based on history, or a result calculated from a measured variable.

In addition, the output device 14 can be used to display, for example, a visible warning sign 26, the appearance of which can be programmed in the measurement apparatus 30. A warning sign can be displayed, for example, if the temperature or sum of excessive temperature goes over a predefined limit value.

According to one embodiment, reception means 27' are arranged in connection with the measurement apparatus 30, for example to detect a request relayed by the reader device 13 to retrieve measurement data 19 from the measurement apparatus 30. More generally it can be stated that the reception means 27' are arranged in connection with the measurement apparatus 30 to control the measurement apparatus 30 through the reader device 13.1, 13.2 by the server arrangement 11. For the reception means 27', for example in the body of the output device 14 there can be an opening, behind which is a sensor 27 necessary for exciting the output device 14. The sensor 27 can be, for example, a microphone or photo-sensor or magnetometer, when it can be deeper, by which the reader device 13.1, such as, for example, a smart phone, can communicate with, now particularly control the output device 14 and thus also the measurement means 15. Thus the phone can, for example, notify the output device 14 of a need to update the code 12 or display the next code 12 in order. In addition, through this it is also possible to set, for example, the measurement apparatus's 30 settings. To these embodiments will be returned hereinafter at a suitable point in the description. The commercial implementation of the photo-sensor 27 can be, for example, Lite-On LTR-308ALS-01.

Figure 4:
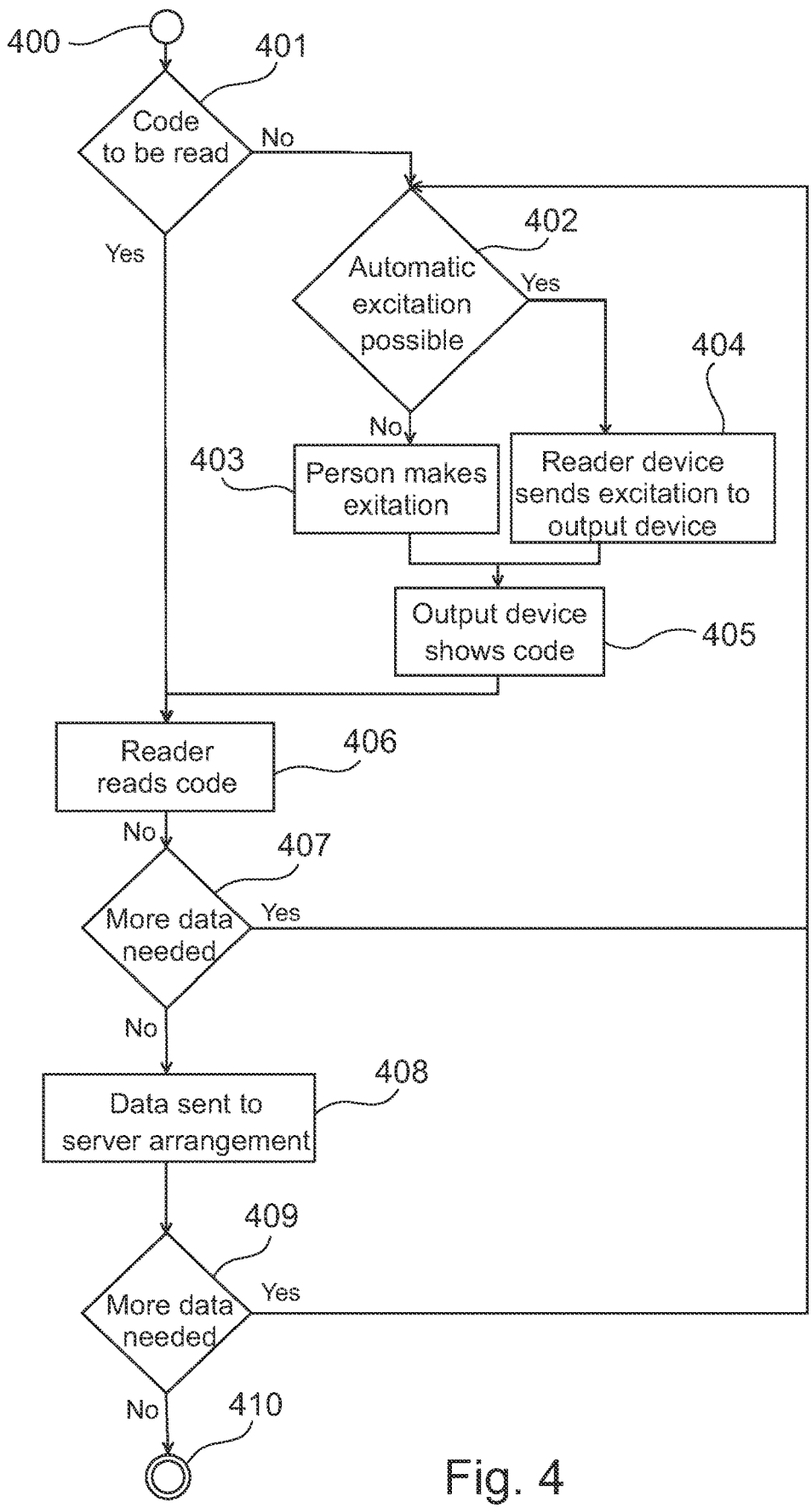
FIG. 4 shows the operation of the system according to the invention, in stages, as a flow diagram.

FIG. 4 shows the operation of the system 10 according to the invention in stages as a flow diagram, when it is wished to send measurement data 19 from the monitoring object 20.1 to the server arrangement 11. As stage 401, a check is made as to whether the visual code 12 intended to be shown on the output device 14 can be read by the reader device 13.1. If it cannot be read, i.e. it is not, for example, visible, its excitation stages 402-405 are carried out. As stage 402, it is checked whether automatic excitation is possible. If it is possible, then as stage 404 excitation is sent by the reader device 13.1 to the output device 14, as a result of which as stage 405 it displays the readable code 12. If automatic excitation is not possible in stage 402, then as stage 403 a person makes the excitation, for example, by pressing a button in the output device 14. Again as a result in stage 405 the output device 14 displays the code 12.

If in stage 401 the code 12 can be read and also as a result of the excitation procedure, then as stage 406, the reader device 13.1 reads the code 12. If when the server arrangement 11 has received the code 12 read by the reader device 13.1 and on its basis performed data transmission, it is determined as stage 407, that more data is needed from the measurement means 15, then a return is made to stage 401.

As stage 408, data is sent to the server arrangement 11 using the reader device 13.1. As stage 409, the server arrangement 11 and/or the reader device 13.1 can examine from the read and/or sent data whether additional data is needed, i.e. for example, is it possibly lacking. If it is needed return again to stage 401.

Figure 5:
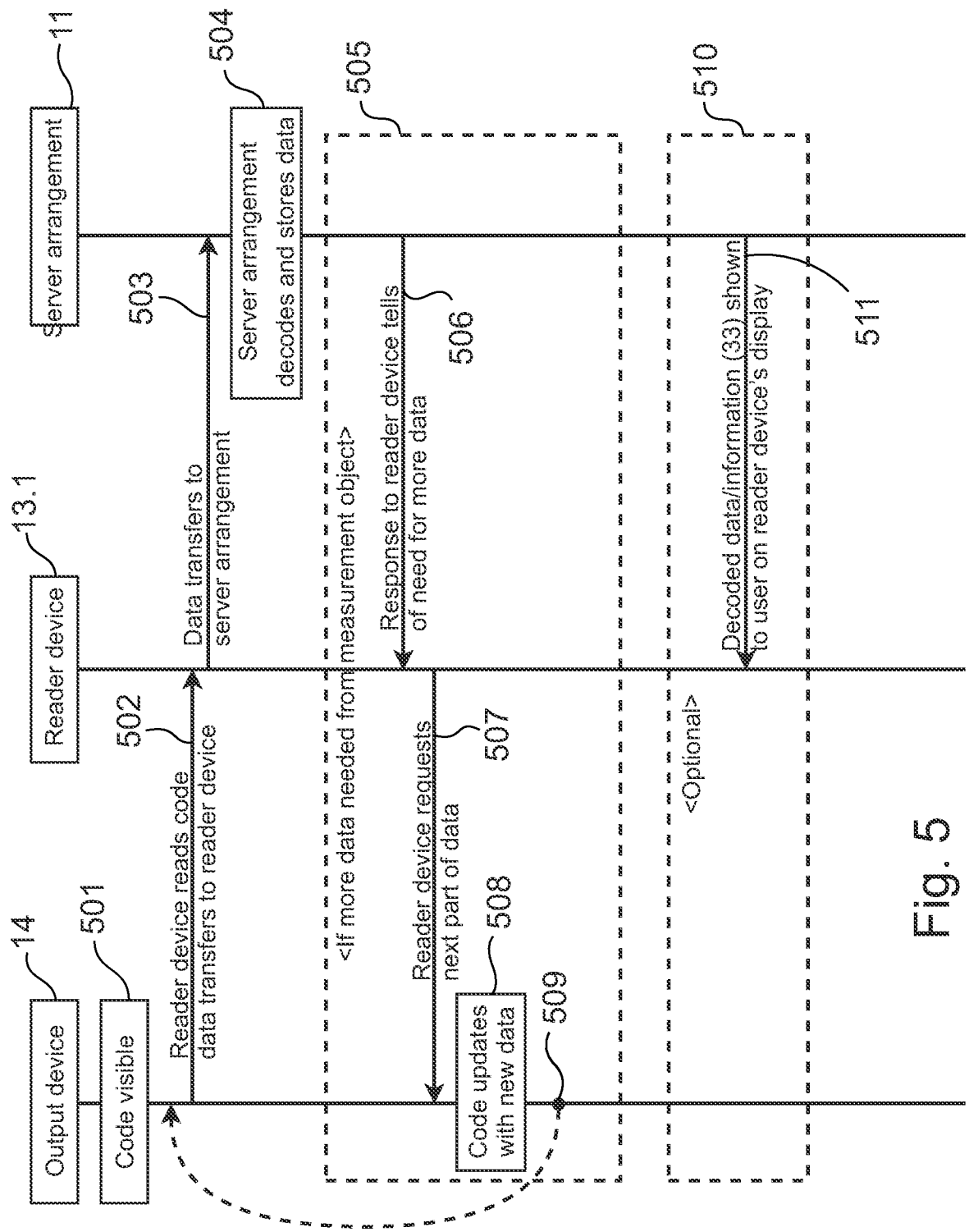
FIG. 5 shows a sequence diagram between the various parts belonging to the system, when processing measurement data.

FIG. 5 shows in turn a sequence diagram of the different parts belonging to the system 10 as parallel time lines. FIG. 5 shows the stages for performing one state-update procedure. As stage 501 it is noted that in the output device 14 there is optical QR code 24, to be read by the reader device's 13.1 camera, visible the whole time. Thus, the reader device 13.1 can read the QR code 24 at any time without needing to excite/inform the output device 14 beforehand. This permits as its part a zero-power passive state of the output device 14, 14', in which code 12 can be displayed without essentially using power.

As stage 502, the reader device 13.1, such as, for example a mobile station, successfully reads the optical code 12, such as, for example, QR code 24, which the output device 14 shows and the data is transferred through it to the reader device 13.1. The read data in the optical code 12 can be, for example, a web address or other data. In the case of a web link, the measurement data 19 on the monitoring object 20.1, sent to the server arrangement 11, is embedded in the web link contained in the QR code 24, as shown in FIG. 3. In a case in which there is no known web link in the data contained in the QR code 24, there can be code in the reader device 13.1, which processes and sends data in a set manner.

As stage 503, the reader device 13.1 sends the data to the server arrangement 11 through a data-transmission network, such as, for example, a mobile network. If the QR code 24 contains a normal web link, when the user 29 once scans the QR-code 24 and opens the web link defined by it, the data 19 unpacked from the QR code 24 transfers automatically to the server arrangement 11 in the link ("URL"). The server arrangement 11 knows what the measurement apparatus 30 user 29 scanned, because the measurement apparatus's 30 identifier-id is also embedded in the read QR code 24 and thus also in the unpacked link.

As stage 504, the server arrangement 11 receives, stores, and processes the data sent to it by the reader device 13.1. If the data is encrypted, the server arrangement 11 also decrypts the data. If the data is packed, the server arrangement 11 also unpacks the data. The data read and sent by the reader device 13.1 is then stored in the server arrangement 11. Similarly, the user 29 can be led to the information page maintained by the server arrangement 11 owing to the activation of the web link contained in the QR code 24.

According to one embodiment, data transmission between the server arrangement 11 and, for example, the measurement apparatus 30, arranged to be formed of the measurement means 15 and the output device 14, is arranged to be two-way and to take place preferably through the reader device 13.1, 13.2. Then, data transmission between the server arrangement 11 and the reader device 13.1 and further also between the reader device 13.1 and the measurement apparatus 30 is also two-way. Two-way data transmission between the server 11 and the measurement apparatus 30 has been achieved several advantages. For example, the measurement apparatus 30 can then be controlled by the server arrangement 11 through the reader device 13.1.

In addition, the data sent to the server arrangement 11 can contain, for example, information as header data as to whether, the monitoring object 20.1, i.e. the output device 14 has still more data available than what was able to be sent already in one QR code 24. Thus the server arrangement 11 can decide if more data must be obtained from the output device 14. Thus the server arrangement 11 is arranged to detect a need to retrieve measurement data 19 from the measurement means 15 according to the reader device's 13.1, 13.2 code 12, for example from the previous transmission.

If it is determined by the server arrangement 11, that all the necessary data was already stored in the server arrangement 11, more data is not needed. Instead of that, if it is determined that data still exists/is needed, the server arrangement 11 can send the reader device 13.1 prompt data to read additional data as a transmission-request response in process 505. The reader device 13.1 is then arranged to send a request from the server arrangement 11 to the measurement means 15 to retrieve measurement data 19 from the measurement means 15. The request to retrieve measurement data 19 from the measurement means 15 is arranged to be created and relayed as a response to the code 12 read already previously by the reader device 13.1, 13.2 and the transmission i.e. handshaking made on its basis.

As stage 506, the reader device 13.1 receives the request created and sent by the server arrangement 11 to retrieve and read more data from the output device 14, more generally from the monitoring object 20.1. The reader device 13.1 receives the request and creates on its basis a signal command according to the settings to be sent to the output device 14. If additional data is not needed, the server arrangement 11 only acknowledges the data-transmission procedure as successfully terminated.

As stage 507, the reader device 13.1 sends the output device 14 a command, such as, for example, a light signal, sound signal, or guides the reader device's 13.1 user 29 to press a set button in the reader device/output device 13.1, 14 to create a command and show it to the output device 14. Using the command, the reader device 13.1 thus requests the next one or some of the measurement means' 15 data 19 requested by the server arrangement 11.

As stage 508, the output device 14 updates the optical code 12 with the next batch of data. Once the code 12 is updated as stage 509 a return is made to stage 501, in which the code 12 contained in the next batch of data can be read from the output device 14 by the reader device 13.1. Stages 502-504 repeat, as above. This process can be continued as long as desired/is necessary.

According to one embodiment, as stage 510, the server arrangement 11 is arranged, as part of the two-way data transmission, to transfer to the reader device 13.1, 13.2 context data 33 relating to the monitoring object 20.1, 20.2, to be presented by the reader device 13.1, 13.2 using data-outputting means 32'. The server arrangement 11 can show this information 33 to the user 29, for example, based on the user's 29 user-rights level. At least part of this context data 33 is created by the server arrangement 11 based on the code 12 read by the reader device 13.1, 13.2 and the data processed from it. Thus the data sent to the server arrangement 11 as a result of reading the QR code 24 and possibly processed there and/or information refined from it, more generally context information 33 can, if necessary, be transferred as stage 511 to the reader device 13.1 and, for example, displayed directly to the user 29 on the reader device's 13.1 display 32 as clear text, such as a web page. At its simplest the information can also be, for example, an indication of an unbroken cold chain, if the a logistics monitoring object demands this. On the basis of the information, the monitoring object's products can be either approved for use, if the cold chain is preserved, or alternatively rejected/directed to further investigation if the cold chain has broken. More generally, the display 32 can be referred to as information output means 32'. At least some of the reader devices 13.1, 13.2 can be equipped with information output means 32'.

Figure 6:
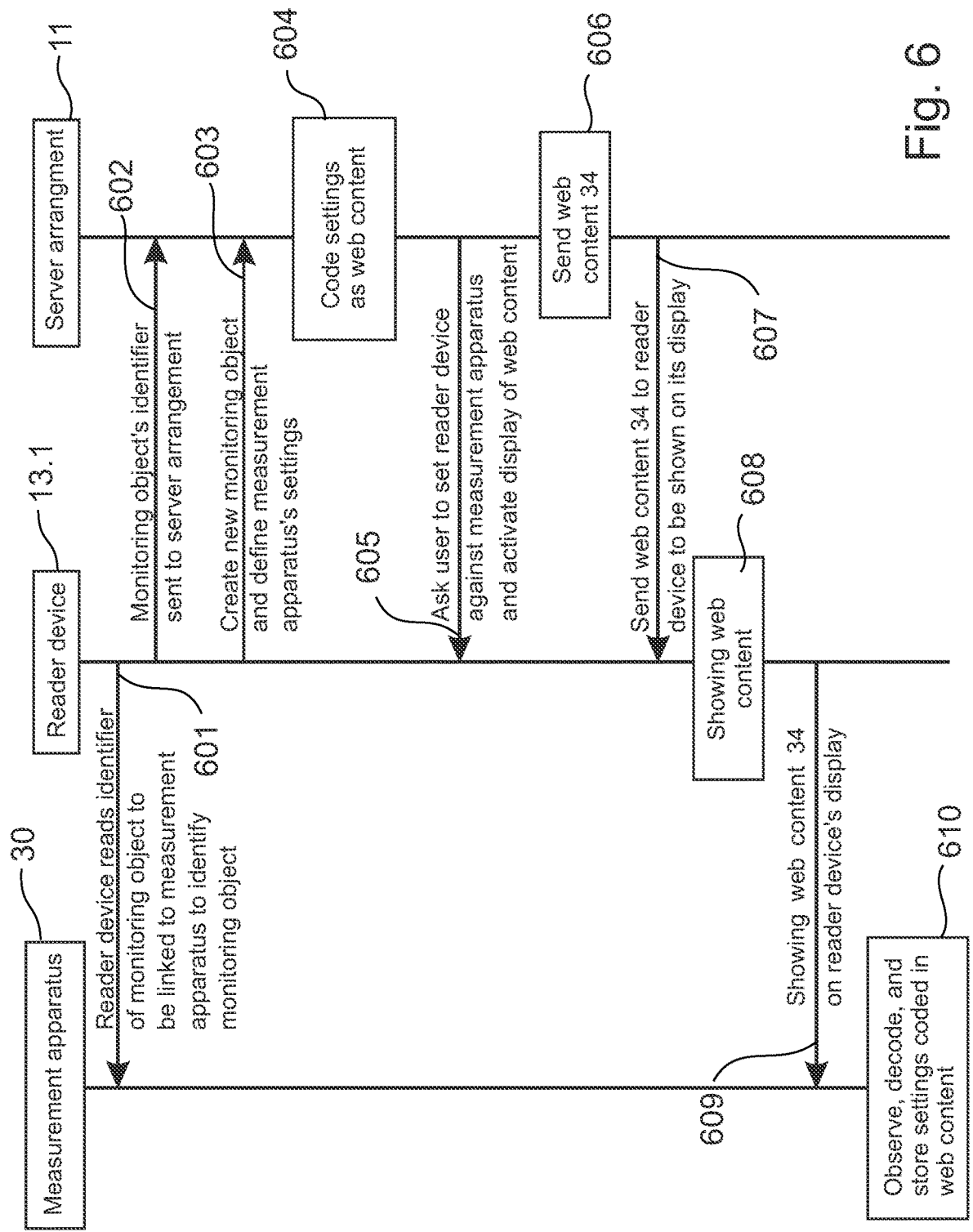
FIG. 6 shows a sequence diagram between the various parts belonging to the system, when making settings in the measurement apparatus.
Figure 7:
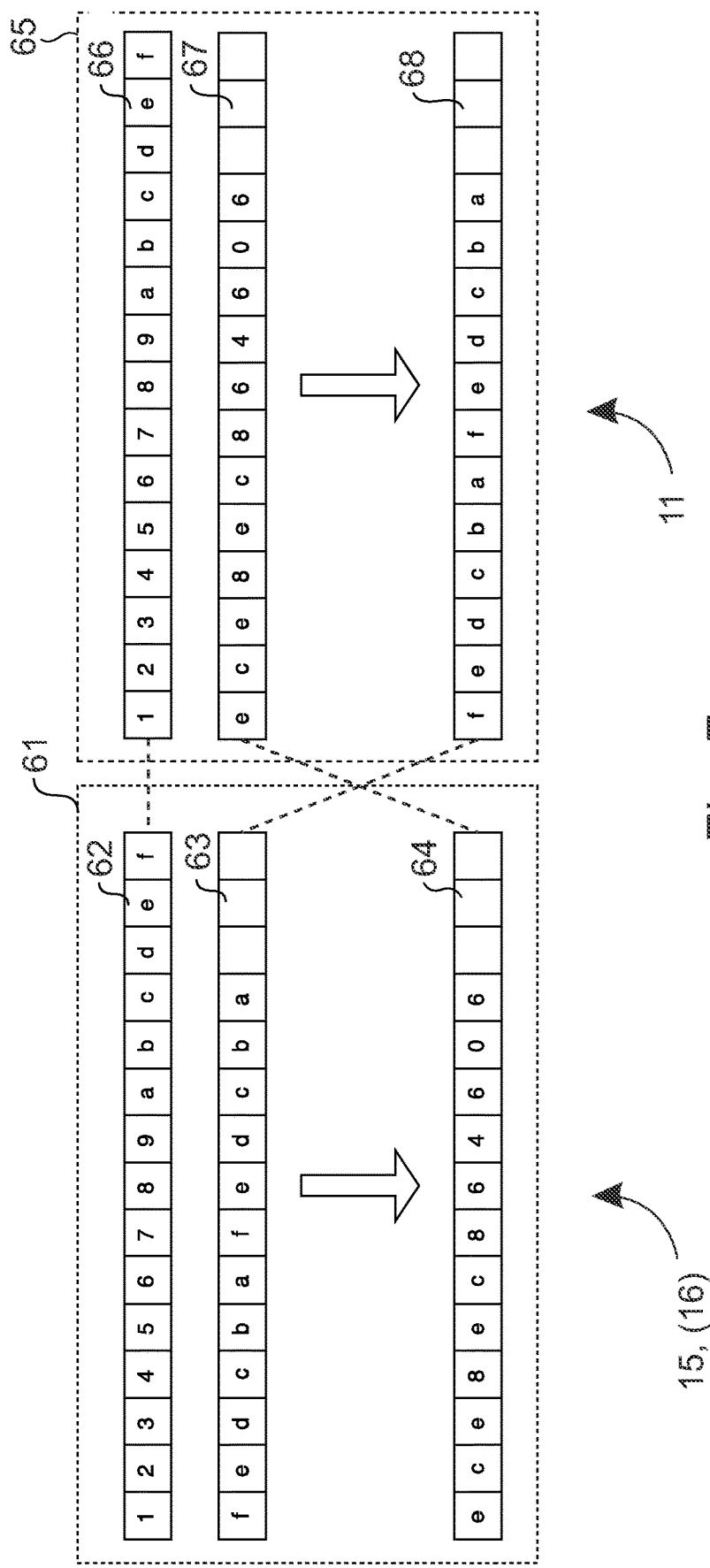
FIG. 7 shows one example of the encryption method used in the invention in encryption and decryption.

FIG. 6 shows one example of a low-power and thus also energy-efficient encryption method possibly used in the invention for first using an encryption key 62 to encrypt the data 63 in the figure's left-hand block 61 and then using an encryption key 66 to open the encryption in the figure's right-hand block 65. Thus according to one embodiment the measurement means 15 are arranged to encrypt the measurement data 19, which is sent from the measurement apparatus 30 to the server arrangement 11 as a result of reading QR code 24, i.e. on its basis.

Block 61 is performed in connection with the measurement means 15. The encryption key 62 can be the whole length of the measurement means' 15 memory 16 and, for example, a one-use random-number queue. The memory 16 can be, for example, 200 Mb or even 1 Gb, when the encryption key 62 can be of a similar length. The encrypted data 63 can be data to be stored in the measurement means' 15 memory 16 and can be, for example, temperature measurements. The data 63 to be encrypted and the encryption key 62 are combined in an XOR operation, giving encrypted measurement data 64. The encrypted measurement data 64 is also stored in the measurement means' 15 memory 16. The encrypted measurement data 64 can replace the memory locations of the encryption key stored in the measurement means' 15 memory 16 as they are used. In other words, the encrypted measurement data 63 is then written over the one-use encryption keys 62 as their characters are used. Thus the memory 16 can be utilized very efficiently. At the same time the encryption keys 62 are destroyed owing to the encryption and the encrypted measurement data 63 cannot be opened, even if the measurement means' 15 memory 16 could be read.

The encryption keys 62, 66 can be random numbers that are also stored in the server arrangement 11. The encryption keys 62 are put in the measurement means' 15 memory 16 when they are manufactured. Each measurement means 15 is thus an individual with its own unique random-number queue as an encryption key. The server arrangement 11 knows the individuated measurement means 15 and the encryption keys 66 in each of them. The encrypted measurement data 63 is in the measurement means 15, but after encryption no external agent can open it without the encryption key 62, on top of which the encrypted measurement data is preferably stored in the memory. If data-transmission to the server arrangement 11 does not succeed for any reason, the measurement data is however in the measurement means' 15 memory 16 and cannot be read before the encrypted measurement data 63 are transmitted to the server arrangement 11 on the basis of QR code 24.

Block 65 shows data decoding using an encryption key 66. This takes place in the server arrangement 11. Each measurement means' 15 encryption key 66 can be stored in the server arrangement 11, in which case encrypted data 67 sent to the server arrangement 11 can be decrypted by an XOR operation to form the original measurement data 68. The encryption then also permits authentication of the monitoring object or product 31. In other words, from a specific measurement means 15 should come data in a specific numerical area, which defines the encryption key arranged in the relevant measurement means 15. The encrypted measurement data can also contain sign bits to perform authentication. If the encrypted measurement data is, for example, 8-bit, then 7 bits of it can be encrypted measurement data and 1 bit a sign bit, which is taken, for example, from the point of the encryption key corresponding that. Because the server knows at what point the sign bit should be, then it can also authenticate the encrypted measurement data's origin, i.e. that it is from the real measurement means 15. Thus the monitoring object 31 can also be arranged to be authenticated based on encryption. Complex computing or encryption algorithms are not needed in XOR encryption. It can be implemented using light processor implementation and is light to implement also in its data-processing requirements. Yet another advantage is that in it there is no need to encrypt actual encryption algorithms, because there are none. Leaking of the encryption key or measurement data from one measurement-means unit to external agents does not help them to open the measurement data of the other measurement-data units.

FIGS. 8a-8c show examples of yet another embodiment relating to the possible implementation of the output device 14'. Here the application example is a cooled delivery 31. According to one embodiment, the output device 14' can also be for one-use out-putting. The recipient of the delivery 31 can then even print a clear text document, which shows for example the information relating to the delivery 31, such as its route, temperature history, and/or to authenticate that the origin of the delivery is genuine. Here, the output device 14' is arranged to be a paper-like or similar one-use output means, on which information can be formed, for example by a physical, (for example matrix or heat), chemical, and/or electrical effect, from the measurement data 19 created by the measurement means 15 or processed from that. The one-use output means, such as, for example, thermal paper, can be preferably detached from the monitoring object 20.1, for example when monitoring ends. Here too, the QR code 24 can first be read using a mobile station and sent to the server arrangement 11, which authenticate to the recipient of the delivery 31 that the data are genuine.

In FIG. 8a the package 31 is being transported and for that time the output device 14' is passive. It can then be empty of presentable data. However, measurements relating to the package 31 and its surroundings (temperature) are, however, made the whole time during transport and are stored in the memory 16 using measurement means 15 arranged with the package 31.

In FIG. 8b the package 31 has arrived at the recipient. The recipient, for example, with the flash of his mobile station or other light signal can excite the output device 14' through a photosensitive sensor 27 integrated in it. Excitation causes QR code 24, more generally code 12, readable by the mobile station to appear on the output device 14', and also, for example, the temperature value at the moment. As described above, the recipient can authenticate the history data contained in the QR code 24 relating to the package 31 by reading the QR code 24 on his mobile station, which then sends the measurement data 19 contained in the QR code 24, for example, encrypted to the web address defined by the QR code 24, which is addressed to the server arrangement 11. The server arrangement 11 decrypts the measurement data 19 in the QR code 24 into clear text and returns it to the mobile station simultaneously authenticating the origin of the data shown on the output device 14' and on the package 31 itself.

According to FIG. 8c the output device 14' can also be detached from the package 31. The recipient can then get it, for example, for his own archiving needs. Here the output device 14' is thus one-use, so that it is very cheap and thus also suits mass products.

The one-use outputting output device 14' draws, for example, its QR code 24 one or more occasions, i.e. it can preferably be output in one or more batches. Part of the QR code 24 can first be drawn on the output device 14' and the other areas of the output device 14' reserved for the QR code 24 remain empty. Data can be added later to the QR code 24, i.e. the empty areas of it can be still filled. Thus the various parts of the visual code 24 can be filled by utilizing the QR code's error-correction algorithms. The reader device 13.1, 13.2 can also take this into account when reading codes 24, which are updated and supplemented in the aforementioned manner.

Owing to the invention, data transmission can take place mainly automatically and safely by reading only the visual code 12 and after then opening/approving the embedded URL link. This make the system 10 easy for the user 29 to use. Authentication can then also take place automatically by the information needed for identification being already combined in the visual code 12.

The invention also permits the position data of the monitoring object 20.1, 20.2 to be defined by the reader device 13.1, 13.2. Once the user 29 has downloaded, for example, after stage 503 of FIG. 5, the server arrangement's 11 web page on the browser of the reader device 13.1, 13.2, the server arrangement 11 can request position data from the user 29, for example, with a HTML5 geolocation API. This allows the reader device 13.1, 13.2 and thus also the monitoring object 20.1, 20.2 to be positioned without any additional software having to be installed in the phone acting as the reader device. The HTML5 geolocation API can use equally, for example, GPS and other positioning methods. When the user 29 has accepted the phone's i.e. reader device's 13.1. 13.2 sharing of position data in connection with reading and the following sending of data, the position of the measuring apparatus 30 will also be stored in the server arrangement 11. Thus the server arrangement 11 knows the measurement apparatus 30 scanning positions, which can then also be drawn on a map.

As an embodiment belonging to two-way data transmission, the server arrangement 11 is arranged to control the operation of the measurement means 15 and/or the output device 14, more generally the measurement apparatus 30, through the reader device 13.1, 13.2. One or more operations are then arranged to be transmitted from the server arrangement 11 to the measurement apparatus 30 using the reader device 13.1, 13.2. By two-way data transmission, for example, the measurement means 15/output device 14 are excited to update the code 12 under the control of the server arrangement 11. It is then possible to combine data precisely under a time stamp without the measurement apparatus 30 having its own correctly set clock. This also saves energy.

Two-way data transmission according to the invention also permits the settings and other values in the memories 16 of the measurement means 15 and/or the output device 14, more generally the measurement apparatus 30, to be altered under the control of the server arrangement 11. We can also refer to the programming/configuration of the measurement apparatus 30, i.e. altering/setting its settings, for example, during start-up.

FIG. 6 shows one example of the configuration of the measurement means 15, more generally of the measurement apparatus 30, for example, during their start-up or re-configuration. Here too two-way data transmission by the reader device 13.1, 13.2 between the server arrangement 11 and the measurement apparatus 30 is utilized, i.e. data transmission is from the server arrangement 11 to the measurement apparatus 30.

Before the programming of the measurement apparatus 30 performed by the server arrangement 11 through the reader device 13.1, 13.2 the reader device 13.1, 13.2 is arranged to control the server arrangement 11 to program the measurement apparatus 30, for example, during their start-up and/or settings change. We can also refer to defining and storing the settings of the measurement apparatus 30 in the server arrangement 11 by the reader device 13.1, 13.2. Quite at the start, for example, as stage 601, the monitoring object 20.1 itself can be identified. There are several different ways to do this. It can be done, for example, by using the reader device 13.1, 13.2 to read the bar-code identifier or other similar identifier in the monitoring object 20.1, 20.2, or by creating data on it by the user's 29 action using the reader device 13.1, 13.2 and then transmitting the monitoring object's identification data to the server arrangement 11 in stage 602. The monitoring object can, of course, also be identified when defining the settings of the measurement apparatus 30 arranged to be connected to it, or even later in a separate operation. The ID identifier of the measurement apparatus 30 or waybill intended to be attached to the object can equally act as its identification. Identification of the monitoring object allows a specific monitoring object (for example a package or pallet) to be linked to the measurement apparatus 30 arranged in it. In other words, as a result the server arrangement 11 knows at any time to which monitoring object the code 12 read at the time created and shown by the measurement apparatus 30 relates.

By the control of the sever system 11 performed by the reader device 13.1, 13.2 to program the measurement apparatus 30, more generally, to set settings, the user 29 of the system 10 can, for example, set or alter the settings or any other information relating to the measurement apparatus 30, which is needed to perform a measurement and/or to present the data formed from that of the monitoring object by the measuring apparatus 30. The settings can be defined on a web page created by the server arrangement 11, which is shown on the reader device's 13.1, 13.2 display 32 and the settings made on which are then stored in the server arrangement 11. The user 29 can select on the web page created by the server arrangement 11, for example, "configure tag" and define the settings from the web page in stage 603. These settings can be, for example: measurement interval, display 14 update interval, battery-saving settings, or some other apparatus setting, for example relating to the measurement means 15. Instead of the reader device 13.1, 13.2, settings can of course be made on the server arrangement 11 also, for example, centrally from some external device. In stage 604, for example a visual presentation or similar web content to be presented on the web page is created using the server arrangement 11. More generally, the server arrangement 11 is arranged to create web content 34, in which the settings are coded, to be presented on the reader device 13.1, 13.2. Besides or as well as the visual presentation, the content 34 can also include, for example, sound.

In stage 605, the user 29 can be asked to set the reader device 13.1, 13.2 and the measurement apparatus 30 to each other so that content data transmission between them, i.e. programming can be carried out and in addition the user 29 asked to activate downloading of the web content created by the server arrangement 11 and its presentation on the reader device's 13.1, 13.2 display 32.

Once the user 29 has defined the desired settings on the server arrangement 11, the user 29 can as a result of state 606 download them the measurement apparatus 30, for example, using the reader device 13.1, 13.2 from the web page created by the server arrangement 11 in stage 604. This can be done, for example, using the reader device's 13.1, 13.2 web browser 39 (FIG. 1), i.e. without any other apparatus, cables, or special properties or software required in the reader device 13.1, 13.2. Thus as stages 606 and 607, the server arrangement 11 sends the reader device 13.1, 13.2 the web content 34, as a result of which the reader device 13.1, 13.2 is arranged to receive the web content 34 from the server arrangement 11. In stage 608, the reader device 13.1, 13.2 is arranged to present on its display 32 the web content 34 in order to enter, i.e. transmit, settings to the measurement apparatus 30. Thus the setting/altering of the settings of the measurement apparatus 30 arranged to be performed through the reader device 13.1, 13.2 includes entering in the measurement apparatus 30 the settings received from the server arrangement 11, which can take place, for example, as a visual presentation or otherwise, for example, as content 34 to be presented on a web page created by the server arrangement 11.

More particularly, in stage 607 the server arrangement 11 sends the reader device 13.1, 13.2 a web page, in which there is content, such as an area that flashes white and black. Thus the data sent by the server arrangement 11 to the measurement apparatus 30 can be encoded, for example, white and black light flashes of different length. Once as a result of stage 605 the user has settled the measurement apparatus's 30 receiver means 27', such as, for example, a photo-sensor 27, at the display 32 of phone, portable computer, or desktop PC, more generally of the reader device 13.1, 13.2, in which is the flashing area of the web page created by the server arrangement 11 and sent to the reader device 13.1, 13.2, the measurement apparatus 30 can be programmed because the reader device 13.1, 13.2 transmits content to the measurement apparatus 30 in stages 608 and 609. The reader device's 13.1, 13.2 data output means 32', i.e. display 32 is then surprisingly also used as a data-inputting means 32" to control the measurement apparatus 30 using the reader device 13.1, 13.2. More generally, an element 32*, such as, for example, the reader device's 13.1, 13.2 display 32, arranged to produce light is arranged to act as the reader device's 13.1, 13.2 data-inputting means 32". A sound source, for example, belonging to the reader device 13.1, 13.2, such as, for example, a loudspeaker, can also be used for this purpose. The format of the web content 34 can be, for example, a Youtube video or even simpler, a simple animation appearing on the web page. In the animation can be, for example, a frame that flashes white and black.

In stage 610, the measurement apparatus 30 receives data through a flashing light on a photo-sensor 27, which belongs to the measurement apparatus 30. Finally, the measurement apparatus 30 decodes the settings arranged for it from the content 34 and stores them in its own memory. Measurements are made and/or the display 14 is then controlled according to these settings. Thus the measurement apparatus 30 is arranged to observe the web content 34 shown on the reader device's 13.1, 13.2 display 32 and decode the settings from it.

In this way, the measurement apparatus 30 can be configured by the server arrangement 11, for example using a web page it created, wirelessly and easily through the web page, with reader device's 13.1, 13.2 display 32 and photo-sensor 27. The data transmitted through flashing lights, can also be encrypted so that erroneous configurations cannot be made from other sources and cloud systems. The aforesaid procedure makes it very simple to make the measurement apparatus's 30 settings. This is very important in terms of the system's usability, if there are many monitoring objects. It also simplifies the implementation of the measurement apparatus 30. Special properties are also not needed in the reader device 13.1, 13.2 to program measurement apparatuses 30, as the system can be implemented in the case of the reader devices 13.1, 13.2 by a standard QR-code reader device, which is already available in many devices. In the case of QR code, such a function is already built into, for example, an iPhone device.

In addition to permitting a measurement apparatus 30 to be connected to a specific monitoring object 20.1, 20.2, this can be used to alter the measurement apparatus's 30 settings, for example, in the middle of a transport chain. This can be needed, for example, when moving from one transport mode to another (truck→aircraft). Then, of course, for example, stages 601, 602, and 603 (in part) can be omitted from the procedure, because the monitoring object 20.1, 20.2 has been already earlier linked to the measurement apparatus 30.

The invention allows users 29 to be authenticated, for example, on the basis of a link defined by QR code 24 or similar readable code 12, so that the user 29 cannot be individuated but it is known that the relevant user 29 is or has been physically present at the monitoring object 20.1, 20.2. The user 29 then uses the reader device 13.1, 13.2 to read the QR code 24 or similar code 12. If it contains valid encrypted measurement data from a defined time, such as, for example, the last 30 minutes, the user is authenticated and authorized by it.

If complete certainty is wanted that the user 29 is at that precise moment (for example, a 1-minute time window) at the monitoring object 20.1, 20.2, when, for example, he sent or sends the monitoring object's 20.1, 20.2 measurement data to the server arrangement 11, further authentication can be requested from the user 29. According to one way of implementation, the server arrangement 11 can create in previous way encrypted web content, show it on its web page, which is shown in stages 606, 607 as shown in FIG. 6 above and then sent by the reader device's 13.1, 13.2 display 32 to the measurement apparatus 30. The web content can be an encrypted authentication ID, which the measurement apparatus 30 decodes. This authentication ID is then embedded in the QR codes 24 data link secretly and the user 29 is asked to read this QR code 24.

When the user 29 rereads the QR code 24, the reader device 13.1, 13.2 sends the embedded authentication ID or similar to the server arrangement 11, which can then ensure that the relevant user 29 really was, for example, a few seconds ago at the monitoring object 20.1, 20.2 and thus also physically present at the measurement apparatus 30. Simultaneously when the authentication ID was transferred to the measurement apparatus 30, other metadata can also be transferred to it. This embodiment prevents the user 29 reopening the link defined by the QR code 24, though the monitoring object 20.1, 20.2 had already gone. For example, after authenticating the user 29, for example, context data 33 relating to the monitoring object 20.1, 20.2 can be sent to him. Thus the reader device 13.1, 13.2 can implement authentication too, without it needing additional properties.

Machine-readable code with a low power consumption, which is particularly suitable, for example, for mass products with a relatively short delivery cycle in the logistics chain, can also be created as follows. According to a first embodiment shown in FIG. 9a, a character display 12' can be used. It is arranged to show main part, for example, of QR code 24 using, for example, one bit. Embedded in the QR code 24 is, in addition, an area 12" of at least one data-pixel, which is arranged to show data to be transmitted (for example, has temperature remained/not remained within set limits). Instead of QR code 24, for example, some 2d code according to standard, such as aztec code or similar, can equally be used to the creation of a static area 12' and the area 12" containing changing data.

According to a second embodiment, which is shown in FIG. 9b, most of the QR code 24 shown on the output device 14 is a preprinted pattern 12'''. In addition, there is in the QR code 24, now in its centre, a data area 12" for data transfer, formed of at least one data-pixel. The preprinted pattern 12''' can show, for example, most of or entirely the server's address, or other similar unchanging information. The preprinted pattern 12''' can be read and defined, for example, at the first reading. At the first reading, in addition to the server address or separately, at the second separate reading, read the data-pixels of the QR code 24, which is now in the middle of the data area 12", in which is at least one pixel. Here or also in the previously presented embodiment, the changing data area 12" can be implemented, for example, using an LCD display or similar.

Figure 11:
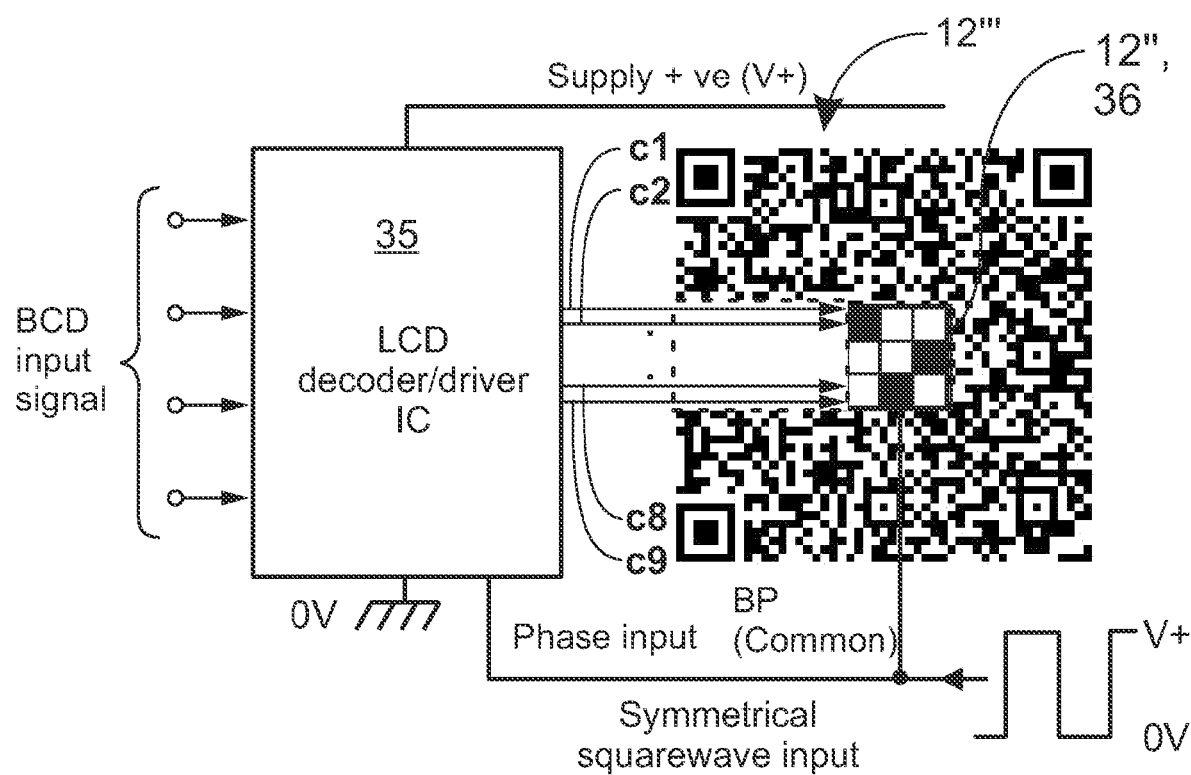
FIG. 11 shows one way to implement the low-power machine-readable code, for example, of FIGS. 10a or 10b.

FIG. 11 shows one way to implement the changing data area's 12" otherwise statically implemented QR code 24. The data area 12" is now formed using a small LCD display 36, in which data is arranged, for example, in a 3×3 matrix form. It is controlled by a controller 35, from which there are control lines c1-c9 to the LCD display 36. The controller 35 is in turn controlled using, for example, a CPU 21' (FIG. 2). The number of elements of the pattern shown on the LCD display 36 can be changed as needed. It can be raised to, for example, 16 items or be only 4 items. In the controller 35 there can be one control pin for each element of the pattern 12, 12" and thus the controller 35 is arranged to control each directly through the pins. Thus each pixel can be controlled individually by the controller 35 independently of each other to show the desired information. If, for example, there are 16 segments in the display, then the display can be controlled directly using hexadecimal control. The number of segments can vary. It can be, for example, 2^2, 2^4, 2^6, more generally, 2^x, in which x=1-8. The monitoring object's state data, which is thus changing data, is shown in the dynamic data area 12" formed by the LCD display 36 and is arranged to be controlled by the controller 35 based on data changing pixel by pixel.

One way to implement data collection relating to this is, for example, when starting measurement to read from the code 12 or store the measurement's reference point, for example, temperature, which is sent to the server for storage. Limit values can be set for the temperature. Then during monitoring only deviations in temperature relative to the reference value are stored and finally it is stated whether the deviations have remained within the set limit values. Another possibility is to store the temperature measurement's angle coefficient based for example on the initial and final reading and/or maximum/minimum value and/or standard deviation.

In the aforementioned embodiments, either the display controller 23 is arranged to form the character display 12' to the QR code 24 or the display is arranged to include, for example, a static pattern 12''' preprinted with ink, both of which can individualize, for example the server's address. More generally, the machine-readable code 12 is arranged to belong the static part 12', 12''' formed most of code 12, which is arranged to be formed using the display controller 23 belonging to the measurement apparatus 30 or as a physical data carrier arranged as the printed and changing part 12" arranged particularly for measurement data 19 or similar changing data.

These ways of implementing the output device shown in FIGS. 9a and 9b are particularly advantageous in, for example, foodstuffs-industry applications. Each product package can then be equipped at the factory with a measurement apparatus 30, which performs measurements on the journey from the factory to the shop and then to the consumer. Then by a very simple and cheap implementation the unbrokenness of the product's cold chain or the product's origin can be certified, for example, to the end user. A very small area of machine-readable code containing changing data is sufficient for this, so that its power consumption is also non-existent. Arranging measurement apparatus in an individual product does not then essentially affect its price.

In addition to a data-transmission system 10, the invention also relates to the aforementioned use of the data-transmission system 10 for monitoring a monitoring object 20.1, 20.2. The monitoring object can be fixed or moving. One very typical moving monitoring object are objects relating to logistics, transported articles or transport units formed of them. The variable monitored can be any variable whatever, or something calculated from it, for example, temperature, moisture, pressure, light, position, VOC, radon, pH, etc. More particularly, the variable can be something in which changes can take place. One point-like example of that is cold deliveries.

It should be understood that the above description and the related figures are intended only to illustrate the present invention. The invention is thus not restricted to only the embodiments described above or defined in the Claims, but many different variations and modifications of the invention, which are possible within the scope of the inventive idea defined by the accompanying claims, will be obvious to one skilled in the art.

The invention claimed is:

1. A data-transmission system, comprising:
   measurement means, including memories, to create and collect measurement data;
   an output device having a zero-power passive state, to show in the zero-power passive state machine-readable code containing the measurement data created using the measurement means and a web address of a web page formed by a server arrangement;
   a power supply for the output device and the measurement means;
   the server arrangement to process and/or store the measurement data and to form the web page on the basis of the web address, the web page comprising context information formed on the basis of the measurement data; and one or several reader devices to read the code from the output device in the zero-power passive state and arranged for data transfer with the server arrangement which data transfer comprises:
sending from the reader device to the server arrangement the measurement data embedded in the web address of the web page; and
as an automatic response of the sending, receiving of context information forme by the server arrangement on the basis of the measurement data embedded to the web address of the web page; and
which output device and measurement means with memories are to be arranged at monitoring objects.

2. The system according to claim 1, wherein data transmission between the server system and the measurement means and the output device, is arranged to be two-way and to take place through the reader device.

3. The system according to claim 1, wherein the measurement means and the output device are arranged to form a measurement apparatus.

4. The system according to claim 3, wherein the operation of the measurement apparatus is arranged to be controlled by the server system through the reader device, by which one or more of the following are arranged to be transmitted from the server system to the measurement apparatus:
a request to retrieve measurement data from the measurement apparatus;
excitation of the measurement means and/or the output device belonging to the measurement apparatus;
synchronization of a clock in the measurement apparatus; and/or
setting and/or changing settings of the measurement means and/or output device.

5. The system according to claim 3, wherein to set settings of the measurement apparatus
the server arrangement is arranged to create web content, in which the settings are coded, to be shown on the reader device;
the reader device is arranged to receive the web content from the server arrangement and show the web content to enter the settings to the measurement apparatus; and
the measurement apparatus is arranged to detect the web content and to decode the settings from the web content.

6. The system according to claim 4, wherein before the control of the measurement apparatus by the server system through the reader device, the settings of the measurement apparatus are arranged to be defined by the reader device to the server arrangement through a web page created by the server arrangement.

7. The system according to claim 3, wherein
the measurement apparatus comprises receiver means to perform a control of the measurement apparatus by the server arrangement through the reader device; and
the reader device comprises data-input means to perform the control of the measurement apparatus by the reader device.

8. The system according to claim 7, wherein the data-input means of the reader device comprises an element to form light.

9. The system according to claim 8, wherein the element to form the light comprises the reader device's display.

10. The system according to claim 3, wherein a request to retrieve measurement data from the measurement apparatus is arranged to be created and transmitted as a response to the code read by the reader device and the transmission made on the basis of that.

11. The system according to claim 3, wherein the server arrangement is arranged to detect a need to retrieve measurement data from the measurement apparatus on the basis of the code read by the reader device.

12. The system according to claim 1, wherein the measurement means comprises:
one or more forming means to create measurement data; and
processor means to process the measurement data created by the forming means for the output de-vice.

13. The system according to claim 1, wherein the measurement means together with the memories are low-power.

14. The system according to claim 1, wherein
the output device comprises a dynamic e-paper display or one-use output means; and
the reader devices comprise one or more of the following: mobile device, camera device equipped with data-transmission means, Augmented Reality glasses, and/or Virtual Reality glasses.

15. The system according to claim 14, wherein the one-use output means is to be outputted in one or more batches.

16. The system according to claim 14, wherein a paper-like or similar one-use output means is arranged to be the output device, on which code is created by a physical, chemical, and/or electrical effect from the measurement data created by the measurement means and/or processed from the measurement data.

17. The system according to claim 14, wherein the one-use output means is arranged to be detached from the monitoring object.

18. The system according to claim 1, wherein the memory of the measurement means comprises a non-volatile low-power memory.

19. The system according to claim 18, wherein the non-volatile low-power memory is FRAM-type memory.

20. The system according to claim 2, wherein
at least some of the reader devices include data-outputting means; and
context data relating to the monitoring object is arranged, as part of the said two-way data transmission, to be moved from the server arrangement to the reader device to be shown on the reader device by the data-outputting means, at least part of the context data being created by the server arrangement on the basis of the code read by the reader device and processed from the code.

21. The system according to claim 3, wherein the machine-readable code comprises a static part comprising a main part of the code, which is arranged to be created by a display controller belonging to the measurement apparatus or as a physical printout, and a changing part of the code arranged especially for measurement data and/or for similar changing data.

22. The system according to claim 1, wherein the measurement means is arranged to encrypt the measurement data using a low-power XOR encryption method using a one-use encryption key.

23. The system according to claim 22, wherein encrypted measurement data is arranged to be stored in a memory location of the encryption key already used for encryption.

24. The system according to claim 1, wherein the monitoring object is arranged to be authenticated based on encryption.

25. The system according to claim 3, wherein to authenticate the presence of the reader device's user relative to the monitoring object
- the server arrangement is arranged to create web content, in which an authentication ID is coded, to be shown on the reader device;
- the reader device is arranged to receive the web content from the server arrangement and show the web content to enter the authentication ID in the measurement apparatus;
- the measurement apparatus is arranged to detect the web content and decode the authentication ID from the web content;
- the measurement apparatus is arranged to update the code on the basis of the authentication ID and present the code on the output device;
- the reader device is arranged to read the code and send the data arranged in the code to the server arrangement; and
- the server arrangement is arranged to authenticate the user's presence relative to the monitoring object on the basis of the data.

26. A method of monitoring an object comprising utilizing the data-transmission system according to claim 1.

* * * * *